United States Patent
Hyde et al.

(10) Patent No.: US 10,008,750 B2
(45) Date of Patent: *Jun. 26, 2018

(54) LOAD-MANAGED ELECTROCHEMICAL ENERGY GENERATION SYSTEM

(71) Applicant: Elwha LLC, Bellevue, WA (US)

(72) Inventors: Roderick A. Hyde, Redmond, WA (US); Jordin T. Kare, San Jose, CA (US); Lowell L. Wood, Jr., Bellevue, WA (US)

(73) Assignee: Elwha LLC, Bellevue, WA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/285,161

(22) Filed: Oct. 4, 2016

(65) Prior Publication Data

US 2017/0025711 A1    Jan. 26, 2017

Related U.S. Application Data

(63) Continuation of application No. 13/953,985, filed on Jul. 30, 2013, now Pat. No. 9,484,601.

(51) Int. Cl.
*H01M 10/42* (2006.01)
*H01M 10/04* (2006.01)
(Continued)

(52) U.S. Cl.
CPC ..... *H01M 10/425* (2013.01); *H01M 10/0445* (2013.01); *H01M 10/0525* (2013.01);
(Continued)

(58) Field of Classification Search
None
See application file for complete search history.

(56) References Cited

U.S. PATENT DOCUMENTS 3,421,015 A   1/1969 Jones et al.
4,792,384 A   12/1988 Levy et al.
(Continued)

FOREIGN PATENT DOCUMENTS

JP    H07-272711    10/1995
JP    2009-199934   9/2009
WO    WO-02/071505  9/2002

OTHER PUBLICATIONS

Battery Performance Characteristics, Electropedia—Battery and Energy Technologies, printed on Jun. 26, 2013, pp. 1-9, http://www.mpoweruk.com/performance.htm.
(Continued)

*Primary Examiner* — Scott J Chmielecki
(74) *Attorney, Agent, or Firm* — Foley & Lardner LLP

(57) ABSTRACT

Described embodiments include a system and a method. A system includes a controllable electrochemical cell configured to output electric power. The controllable cell includes an electrolyte and a first working electrode configured to transfer electrons to or from the electrolyte. The controllable cell includes a second working electrode configured to transfer electrons to or from the electrolyte. The controllable cell includes a gating electrode spaced-apart from the second working electrode. The gating electrode is configured, if biased relative to the second working electrode, to modify an electric charge, field, or potential in the space between the electrolyte and the second working electrode. The controllable cell includes a control circuit coupled to the gating electrode of the controllable cell and configured to apply a biasing signal responsive to an electrical property of an external electrical load coupled to the controllable cell.

20 Claims, 12 Drawing Sheets

(51) Int. Cl.
*H01M 10/0525* (2010.01)
*H01M 10/12* (2006.01)
*H01M 10/34* (2006.01)
*H01M 10/44* (2006.01)
*H01M 10/48* (2006.01)
*H01M 10/30* (2006.01)
*H01M 6/50* (2006.01)

(52) U.S. Cl.
CPC ....... *H01M 10/122* (2013.01); *H01M 10/345* (2013.01); *H01M 10/44* (2013.01); *H01M 10/443* (2013.01); *H01M 10/486* (2013.01); *H01M 6/5005* (2013.01); *H01M 10/30* (2013.01)

(56) References Cited

U.S. PATENT DOCUMENTS

| | | | |
|---|---|---|---|
| 4,935,688 | A | 6/1990 | Mistry et al. |
| 5,543,701 | A | 8/1996 | Leung et al. |
| 5,645,949 | A | 7/1997 | Young |
| 6,264,709 | B1 | 7/2001 | Yoon et al. |
| 6,593,669 | B1 | 7/2003 | Lemaire et al. |
| 7,485,072 | B2 | 2/2009 | Chuang et al. |
| 7,679,110 | B2 | 3/2010 | Armgarth et al. |
| 8,147,659 | B2 | 4/2012 | Lal et al. |
| 9,343,783 | B2 * | 5/2016 | Hyde ................ H01M 10/4257 |
| 2002/0001745 | A1 | 1/2002 | Gartstein et al. |
| 2007/0026266 | A1 | 2/2007 | Pelton et al. |
| 2007/0212596 | A1 | 9/2007 | Nebrigic et al. |
| 2007/0287043 | A1 | 12/2007 | Marsh et al. |
| 2008/0116080 | A1 * | 5/2008 | Lal .......................... C25B 1/003 205/334 |
| 2011/0156229 | A1 * | 6/2011 | Shinohara ......... H01L 23/49531 257/676 |
| 2012/0212286 | A1 * | 8/2012 | Yokou .................. H02M 7/003 327/537 |
| 2012/0213319 | A1 | 8/2012 | Kwan et al. |
| 2012/0268057 | A1 * | 10/2012 | Wu ....................... H01M 10/44 320/103 |
| 2012/0280308 | A1 * | 11/2012 | Disney .............. H01L 23/49562 257/329 |
| 2013/0140189 | A1 * | 6/2013 | Mishra ...................... C25B 1/04 205/628 |
| 2015/0035491 | A1 * | 2/2015 | Hyde ................. H01M 10/4257 320/125 |
| 2015/0035691 | A1 | 2/2015 | Chiricosta et al. |
| 2015/0037622 | A1 | 2/2015 | Hyde et al. |
| 2015/0037623 | A1 * | 2/2015 | Hyde ................ H01M 10/0445 429/50 |

OTHER PUBLICATIONS

Cell Construction, Electropedia—Battery and Energy Technologies, printed on Jun. 26, 2013, pp. 1-11, http://www.mpoweruk.com/cell_construction.htm#tradeoff.

Schneider et al., An Alternating Current Battery, Berichte der Bunsengesellschaft fur physikalische Chemie—Wiley Online Library, Jan. 1993, pp. 55-58, http://onlinelibrary.wiley.com/doi/101002/bbpc.19930970111/abstract.

The Commercialization of Bipolar Technology, The Advanced Lead-Acid Battery Bipolar Designs—A Commercial Reality, printed on Jun. 14, 2013, p. 1, www.alabc.org.

What is the C-rate? Battery University, printed on Jul. 1, 2013, pp. 1-3, http://batteryuniversity.com/learn/article/what_is_the_c_rate.

Search Report for International Application No. PCT/US2014/048028, dated Nov. 6, 2014, pp. 1-4.

\* cited by examiner

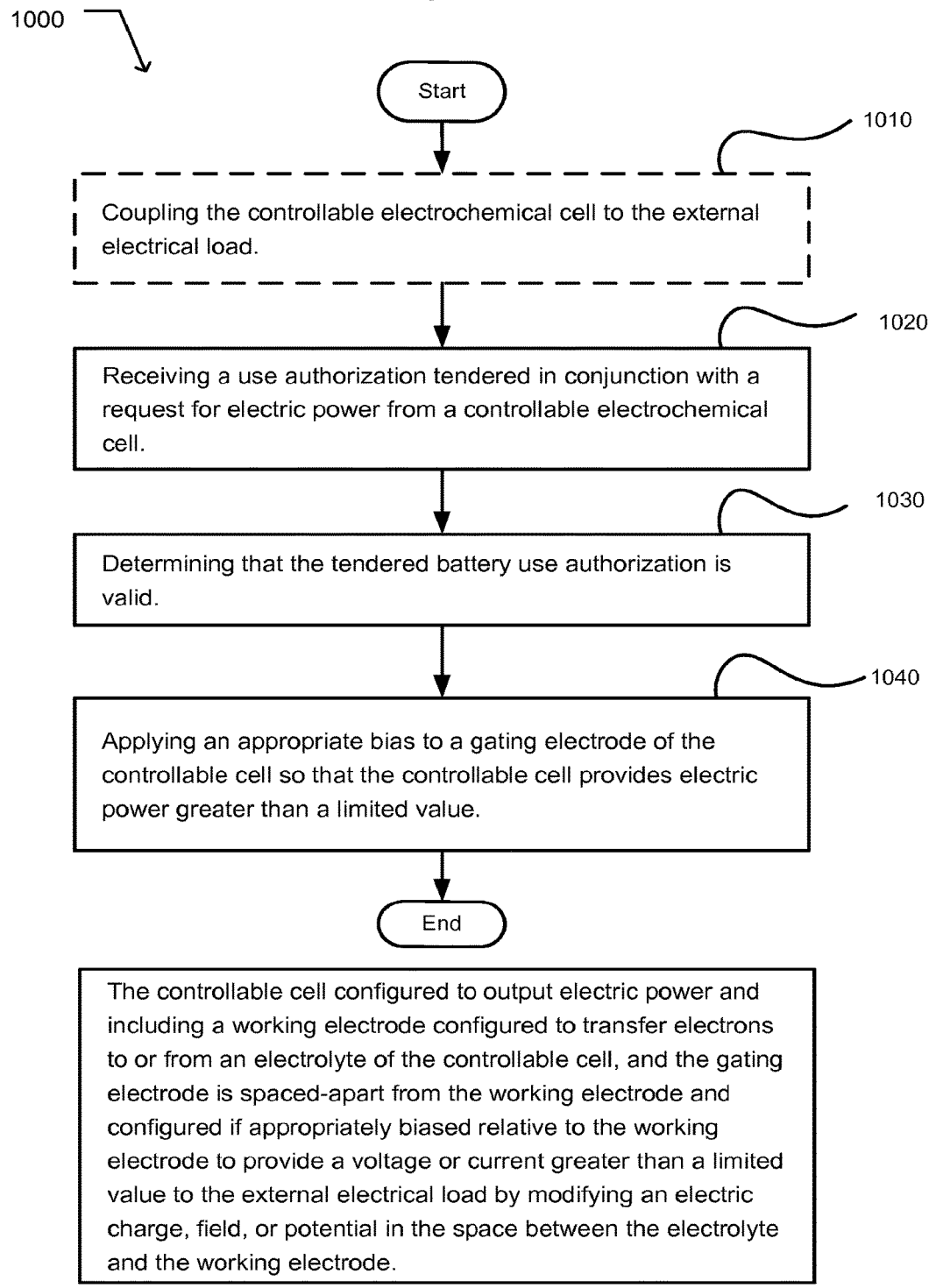

LOAD-MANAGED ELECTROCHEMICAL ENERGY GENERATION SYSTEM

PRIORITY APPLICATIONS

The present application is a continuation of U.S. patent application Ser. No. 13/953,985, filed on Jul. 30, 2013, the entire disclosure of which is hereby incorporated by reference.

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED PATENT APPLICATIONS

The present application claims the benefit of the earliest available effective filing date(s) from the following listed application(s) (the "Priority Applications"), if any, listed below (e.g., claims earliest available priority dates for other than provisional patent applications or claims benefits under 35 U.S.C. § 119(e) for provisional patent applications, for any and all parent, grandparent, great-grandparent, etc. applications of the Priority Application(s)). In addition, the present application is related to the "Related Applications," if any, listed below.

RELATED APPLICATIONS

U.S. patent application Ser. No. 13/954,007, entitled ELECTROCHEMICAL ENERGY GENERATION SYSTEM HAVING INDIVIDUALLY CONTROLLABLE CELLS, naming Roderick A. Hyde, Jordin T. Kare, and Lowell L. Wood, Jr. as inventors, filed Jul. 30, 2013 (now U.S. Pat. No. 9,343,783), is related to the present application.

U.S. patent application Ser. No. 13/954,032, entitled MANAGED ACCESS ELECTROCHEMICAL ENERGY GENERATION SYSTEM, naming Roderick A. Hyde, Jordin T. Kare, and Lowell L. Wood, Jr. as inventors, filed Jul. 30, 2013, is related to the present application.

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

SUMMARY

For example, and without limitation, an embodiment of the subject matter described herein includes a system. The system includes a controllable electrochemical cell configured to output electric power. The controllable cell includes an electrolyte and a first working electrode configured to transfer electrons to or from the electrolyte. The controllable cell includes a second working electrode configured to transfer electrons to or from the electrolyte. The controllable cell includes a gating electrode spaced-apart from the second working electrode. The gating electrode is configured, if biased relative to the second working electrode, to modify an electric charge, field, or potential in the space between the electrolyte and the second working electrode. The controllable cell includes a control circuit coupled to the gating electrode of the controllable cell and configured to apply a biasing signal responsive to an electrical property of an external electrical load coupled to the controllable cell.

For example, and without limitation, an embodiment of the subject matter described herein includes a method. The method includes coupling a controllable electrochemical cell to an electrical load. The controllable cell includes a working electrode configured to transfer electrons to or from an electrolyte of the controllable cell. The controllable cell includes a gating electrode spaced-apart from the working electrode and configured, if biased relative to the working electrode, to modify an electric charge, field, or potential in the space between the electrolyte and the working electrode. The method includes receiving indicia of an electrical property of the electrical load. The method includes biasing a gating electrode of the controllable cell in response to the indicia of the electrical property of the electrical load.

In an embodiment, the method includes sensing indicia of a change in current draw or a voltage across output terminal electrodes of the controllable cell. In an embodiment, the method includes sensing indicia of an increased temperature of the controllable cell. In an embodiment, the method includes outputting electric power from the controllable cell to the electrical load.

For example, and without limitation, an embodiment of the subject matter described herein includes a system. The system includes means for coupling a controllable electrochemical cell configured to output electric power to an electrical load. The controllable cell includes a working electrode configured to transfer electrons to or from an electrolyte of the controllable cell. The controllable cell includes a gating electrode spaced-apart from the working electrode and configured if biased relative to the working electrode to modify an electric charge, field, or potential in the space between the electrolyte and the working electrode. The system includes means for receiving indicia of an electrical property of the electrical load. The system includes means for biasing a gating electrode of the controllable cell in response to the indicia of the electrical property of the electrical load.

In an embodiment, the system includes means for sensing indicia of a change in current draw or a voltage across output terminal electrodes of the controllable cell. In an embodiment, the system includes means for sensing indicia of an increased temperature of the controllable cell.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 12 illustrates an example operational flow 1000.

DETAILED DESCRIPTION

Figure 1:
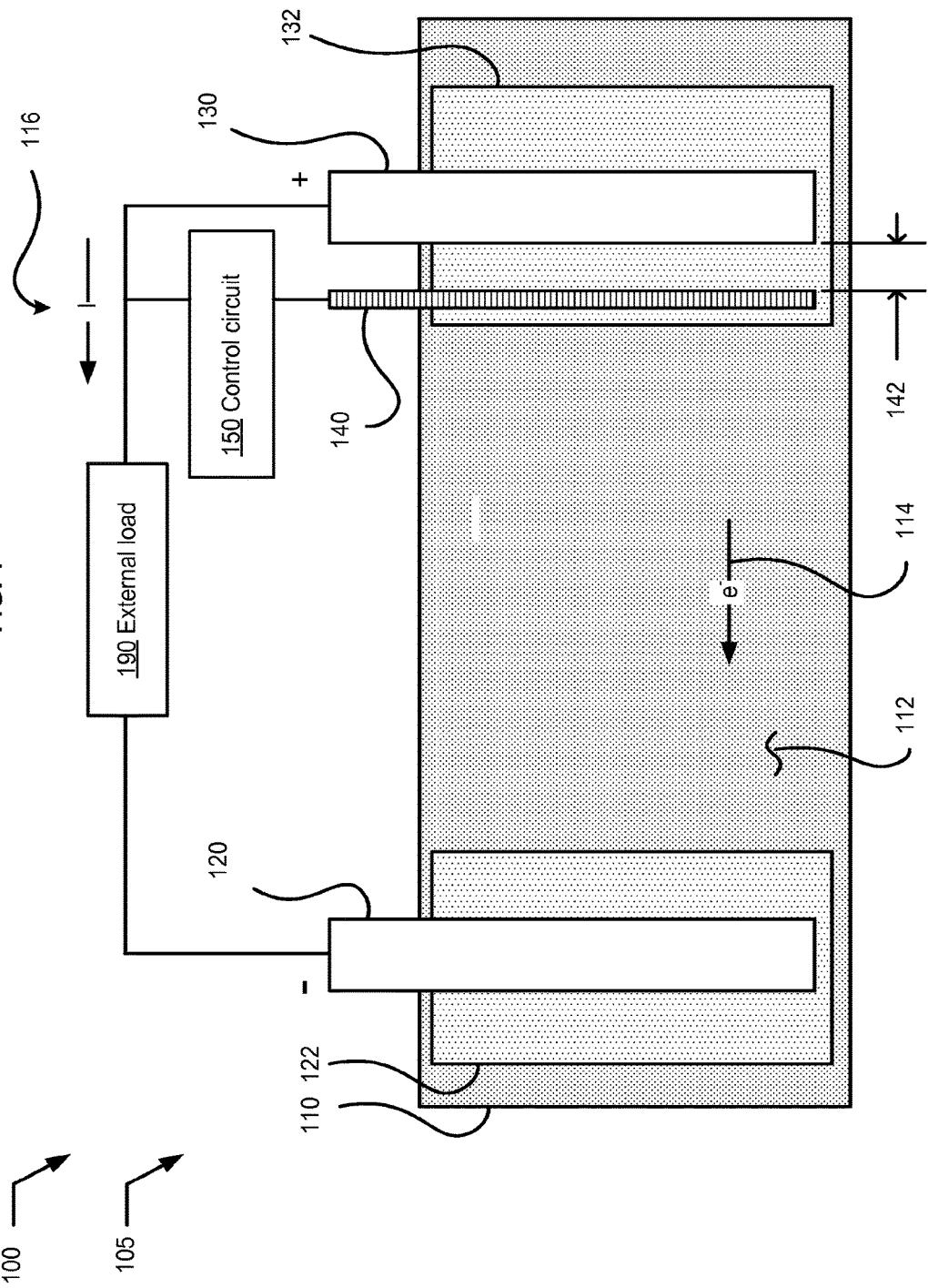
FIG. 1 schematically illustrates an example environment 100 in which embodiments may be implemented.

In the following detailed description, reference is made to the accompanying drawings, which form a part hereof. In the drawings, similar symbols typically identify similar components, unless context dictates otherwise. The illustrated embodiments described in the detailed description, drawings, and claims are not meant to be limiting. Other embodiments may be utilized, and other changes may be made, without departing from the spirit or scope of the subject matter presented here.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various implementations by which processes and/or systems and/or other technologies described herein can be effected (e.g., hardware, software, and/or firmware), and that the preferred implementation will vary with the context in which the processes and/or systems and/or other technologies are deployed. For example, if an implementer determines that speed and accuracy are paramount, the implementer may opt for a mainly hardware and/or firmware implementation; alternatively, if flexibility is paramount, the implementer may opt for a mainly software implementation; or, yet again alternatively, the implementer may opt for some combination of hardware, software, and/or firmware. Hence, there are several possible implementations by which the processes and/or devices and/or other technologies described herein may be effected, none of which is inherently superior to the other in that any implementation to be utilized is a choice dependent upon the context in which the implementation will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures suitable to implement an operation. Electronic circuitry, for example, may manifest one or more paths of electrical current constructed and arranged to implement various logic functions as described herein. In some implementations, one or more media are configured to bear a device-detectable implementation if such media hold or transmit a special-purpose device instruction set operable to perform as described herein. In some variants, for example, this may manifest as an update or other modification of existing software or firmware, or of gate arrays or other programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or otherwise invoking circuitry for enabling, triggering, coordinating, requesting, or otherwise causing one or more occurrences of any functional operations described below. In some variants, operational or other logical descriptions herein may be expressed directly as source code and compiled or otherwise invoked as an executable instruction sequence. In some contexts, for example, C++ or other code sequences can be compiled directly or otherwise implemented in high-level descriptor languages (e.g., a logic-synthesizable language, a hardware description language, a hardware design simulation, and/or other such similar mode(s) of expression). Alternatively or additionally, some or all of the logical expression may be manifested as a Verilog-type hardware description or other circuitry model before physical implementation in hardware, especially for basic operations or timing-critical applications. Those skilled in the art will recognize how to obtain, configure, and optimize suitable transmission or computational elements, material supplies, actuators, or other common structures in light of these teachings.

In a general sense, those skilled in the art will also recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

FIG. 1 schematically illustrates an example environment 100 in which embodiments may be implemented. The environment includes a system 105 and an external load 190. The system includes a controllable electrochemical cell 110 configured to output electric power, illustrated by a current "I" 116. The controllable electrochemical cell may include a voltaic cell, a flow cell, a fuel cell, or other devices that convert chemical energy into electrical energy. The controllable cell may be a non-rechargeable or a rechargeable controllable cell. The controllable cell includes an electrolyte 112. For example, in an embodiment, an electrolyte may be described as a substance that conducts charged ions from one working electrode to the other working electrode inside an electrochemical cell. In an embodiment, the electrolyte may include a commonly used electrolyte used to conduct electrons between electrodes in an electrochemical cell. For example, the electrolyte may include sulfuric acid in a lead-acid battery, lithium salts in a lithium-ion battery, potassium hydroxide in a NiMH battery, or an aqueous alkaline solution in a metal hydride fuel cell. The controllable cell includes a first working electrode 120 configured to transfer electrons to or from the electrolyte. The controllable cell includes a second working electrode 130 configured to transfer electrons to or from the electrolyte. The electrons are illustrated by "e.sup.-" 114 in the electrolyte, and are further illustrated as flowing from the second working electrode to the first electrode when the controllable cell is discharging electricity. In an embodiment where the controllable cell is being recharged, the electrons flow from the first electrode to the second electrode. In an embodiment, a working electrode is an electrode in an electrochemical system on which the reaction of interest is occurring. In an embodiment, a terminal electrode is an electrode to which a load is coupled. In certain instances, a working electrode may also be a terminal electrode. The controllable cell includes a gating electrode 140 spaced-apart from the second working electrode. The gating electrode is configured if biased relative to the second working electrode to modify an electric charge, field, or potential in the space 142 between the electrolyte and the second working electrode. In an embodiment, the gating electrode may be spaced apart from the first electrode instead of the second electrode. The controllable cell includes a control circuit 150 coupled to the gating electrode of the controllable cell and configured to apply a biasing signal responsive to an electrical property of the external electrical load 190 coupled to the controllable cell. In an embodiment, the external electrical load may include load that absorbs power from or supplies power to the controllable cell in the case where the controllable cell is rechargeable. In an embodiment, the external electrical load includes a current sink. For example, a current sink may include a resistive load. For example, a current sink may include an electronic device, such as a computing device. For example, a current sink may include an electric fraction motor of an electric or hybrid vehicle. In an embodiment, the external electric load may include a current source. For example, a current source may include charging device charging or configured to recharge the electrochemical cell.

In an embodiment, the controllable cell 110 is configured to output high-current electric power. For example, a output high-current configuration may include thin working electrodes that are relatively closely spaced. For example, a output high-current configuration may include working electrodes with a large area, and a relatively small gap between the first working electrode 120 and the second working electrode 130. In an embodiment, the controllable cell is configured to allow a drain rate greater than 2 C without overheating or damage. The C-rate signifies a discharge rate relative to the capacity of a battery in one hour. A rate of 1 C would mean an entire 1.6 Ah battery would be discharged in 1 hour at a discharge current of 1.6 A. A 2 C rate would mean a discharge current of 3.2 A. In an embodiment, the controllable cell is configured to allow a drain rate greater than 4 C without overheating or damage. In an embodiment, the controllable cell is configured to allow a drain rate greater than 8 C without overheating or damage. For example, a high-drain-rate Li-polymer battery developed for a high-discharge current for a short period of time may allow a drain rate of between 5 C-35 C rate without overheating or damage. In an embodiment, the controllable cell is configured to allow a drain rate greater than 12 C without overheating or damage. In an embodiment, the controllable cell is configured to store or output electrical power.

In an embodiment, the current 116 flowing through the controllable cell 110 flows predominantly between the first electrode 120 and the second electrode 130. In an embodiment, the first working electrode is in a first interfacial region 122 of the electrolyte 112 proximate to the first working electrode. In an embodiment, the second working electrode is in a second interfacial region 132 of the electrolyte proximate to the second working electrode. In an embodiment, the gating electrode is spaced-apart 142 from the second working electrode, and interposed in the electrolyte in a path of electron flow between the first working electrode and the second working electrode. In an embodiment, the gating electrode is appropriately spaced-apart 142 from the second working electrode in response to a desired characteristic of the controllable cell. In an embodiment, the gating electrode is appropriately spaced-apart 142 from the second working electrode in response to an electrochemistry of the controllable cell. In an embodiment, the first working electrode, the second working electrode, the gating electrode, and the control circuitry are configured or optimized to deliver pulsed electric power to the external electrical load 190.

In an embodiment, the gating electrode 140 is spaced-apart 142 from the second working electrode 130 and configured to accelerate or facilitate a release or movement of electrons from the second electrode and into the electrolyte 112 in response to an application of a voltage bias. For example, in an embodiment, the applied voltage bias may be considered as creating an accelerating potential. For example, in an embodiment, the gating electrode and the second electrode are very close together, i.e., within an electron diffusion distance, and the applied voltage bias to the gating electrode pulls the electrons 114 free of a surface of the second working electrode. In an embodiment, the release or movement of electrons from the second electrode in response to the application of the voltage bias is at least twice the release or movement of electrons from the second electrode without the application of the voltage bias. In an embodiment, the release or movement of electrons from the second electrode in response to the application of the voltage bias is at least four times the release or movement of electrons from the second electrode without the application of the voltage bias. In an embodiment, the control circuit 150 is configured to apply to the gating electrode 140 the voltage bias accelerating or facilitating the release or movement of electrons.

In an embodiment, the gating electrode 140 is spaced-apart 142 from the second working electrode 130 and configured to retard or inhibit a release or movement of electrons from the second electrode and into the electrolyte 112 in response to an application of a voltage bias. For example, the voltage bias may be considered as a retarding potential. For example, in an embodiment, the gating electrode and the second electrode are very close together, i.e., within electron diffusion distance, and the biased gating electrode 140 holds, retards, or inhibits movement of the electrons at the surface of the second electrode. In an embodiment, the release or movement of electrons from the second electrode in response to the application of the retarding or inhibiting voltage bias is less than one-tenth of the release or movement of electrons from the second electrode without the application of the retarding or inhibiting voltage bias. In an embodiment, the release or movement of electrons from the second electrode in response to the application of the retarding or inhibiting voltage bias is less than one-hundredth of the release or movement of electrons from the second electrode without the application of the retarding or inhibiting voltage bias. In an embodiment, the control circuit 150 is configured to apply to the gating electrode the voltage bias retarding or inhibiting a release or movement of electrons.

In an embodiment, the control circuit 150 is configured to apply a biasing voltage to the gating electrode 140 of the controllable cell 110 facilitating a release or movement of electrons during current pulses to the external electrical load 190. In an embodiment, the control circuit is configured to apply a biasing voltage to the gating electrode of the controllable cell suppressing a self-discharge current. For example, the self-discharge current may be suppressed between current pulses. For example, the self-discharge current may be suppressed during a period of inactivity, such as when the controllable cell is in storage. In an embodiment, the biasing voltage suppressing a self-discharge current is provided by the controllable cell. In an embodiment, the biasing voltage suppressing a self-discharge current is provided by a voltage source other than the controllable cell. For example, the voltage source may include a power supply fed by a commonly available 50 or 60 cycle current. In an embodiment, the biasing voltage suppressing a self-discharge current is provided by another cell coupled in series with the controllable cell. For example, the another cell may include another controllable cell coupled in a series with the controllable cell.

In an embodiment, the control circuit 150 is configured to apply a biasing signal responsive to an electric power requirement of the external electrical load 190 coupled to the controllable cell 110. In an embodiment, the control circuit is configured to apply a biasing signal responsive to a condition of an external electrical load coupled to the controllable cell. In an embodiment, the control circuit is configured to apply at least a part of an output voltage of the controllable cell to the gating electrode so that the controllable cell has at least two stable output states corresponding to a low impedance and a high impedance.

In an embodiment, the control circuit 150 is configured to decrease an effective electrochemical voltage of the controllable cell 110 or increase an effective internal resistance of the controllable cell by applying a biasing signal responsive to a current 116 flow to the external electrical load 190 exceeding a predetermined value. For example, the biasing signal may apply a biasing voltage to the gating electrode 140 retarding a release or movement of electrons from the second working electrode 130. For example, an in-line current sensor (not illustrated) may sense the current flow exceeding a predetermined value. In an embodiment, the control circuit is configured to decrease an effective electrochemical voltage of the controllable cell or increase an effective internal resistance of the controllable cell by applying a biasing signal responsive to a sensed voltage drop across an internal shunt resistance of the controllable cell exceeding a predetermined value. For example, an in-line current sensor (not illustrated) may sense the current flow to the external electrical load. In an embodiment, the control circuit is configured to decrease an effective electrochemical voltage of the controllable cell or increase an effective internal resistance of the controllable cell by applying a biasing signal responsive to a sensed temperature rise within the controllable cell exceeding a predetermined value. For example, a temperature sensor may sense a temperature rise in the electrolyte 112, or a temperature rise may be inferred in response to an increased current flow to the external electrical load.

In an embodiment, the gating electrode 140 may be structured as a grid or a patterned structure that is close to but separate from a working electrode, such as the second working electrode 130. In an embodiment, the gating electrode may be thought of as functioning similarly to a grid controlling current in a vacuum tube. In an embodiment, the screen grid includes a screen grid surrounding or enclosing a portion of a circumference of a columnar second working electrode 130. In an embodiment, the screen grid includes a substantially planar screen grid spaced-apart 142 from a substantially planar second working electrode. In an embodiment, the gating electrode is disposed in an electrolyte flow channel. In an embodiment, a surface described by the gating electrode substantially mirrors and is spaced-apart from a surface described by the second working electrode. In an embodiment, the gating electrode provides a relatively low area coverage fraction relative to the area of its proximate working electrode. In an embodiment, the spacing between conductors of the gating electrode is less than or comparable to the thickness of the interfacial region.

In an embodiment, the control circuit 150 is configured to generate the biasing signal responsive to an arbitrary waveform requirement of an external electrical load 190 coupled to the controllable cell 110. In an embodiment, the arbitrary waveform requirement includes a DC wave. In an embodiment, the arbitrary waveform requirement includes a unipolar pulsed DC wave. In an embodiment, the arbitrary waveform requirement includes a varying unipolar DC voltage. For example, a varying unipolar DC wave may include a half sine wave, or a DC offset wave. In an embodiment, the arbitrary waveform requirement includes a DC wave having a peak of less than 2 volts. In an embodiment, the external load 190 coupled to the controllable cell includes a low-voltage computer circuit.

Figure 2:
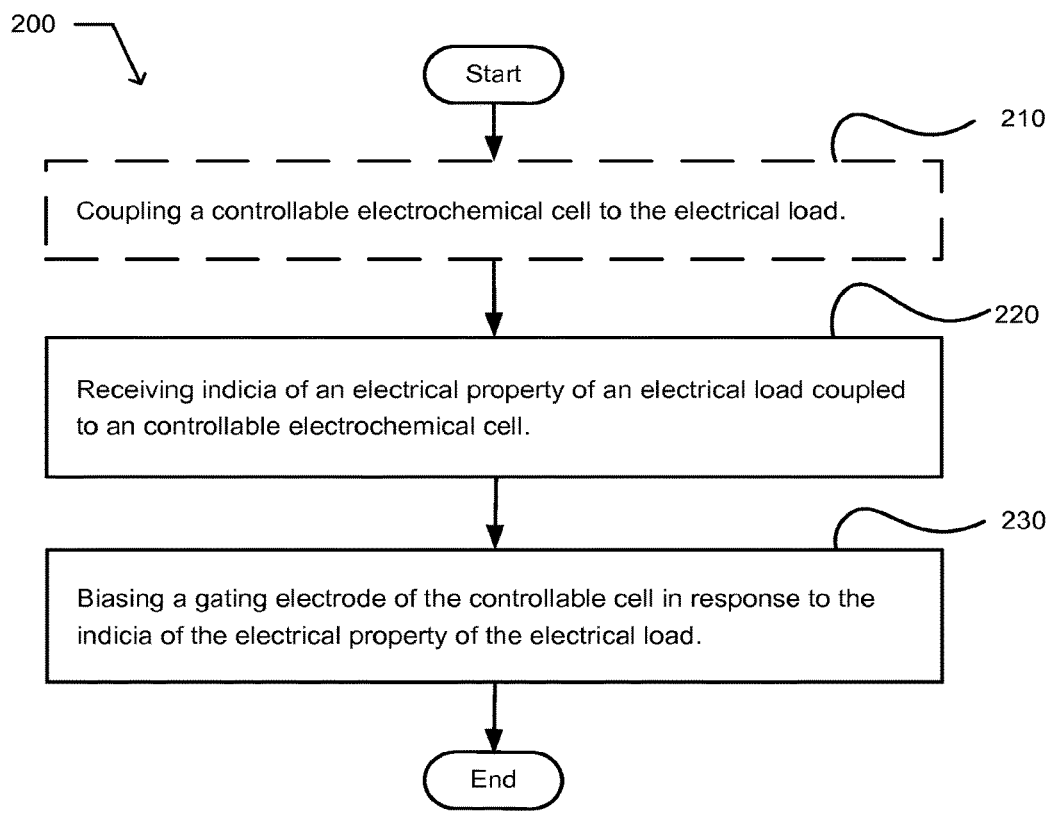
FIG. 2 illustrates an example operational flow 200.

FIG. 2 illustrates an example operational flow 200. After a start operation, the operational flow includes reception operation 220. The reception operation includes indicia of an electrical property of an electrical load coupled to a controllable electrochemical cell. In an embodiment, "indicia" may include one data point, such as an impedance of the electrical load. In an embodiment, "indicia" may include two or more data points, such as impedance and a timing signal. In an embodiment, the reception operation may be implemented by the control circuit 150 described in conjunction with FIG. 1 receiving a result from a testing the external load 150 for the electrical property, or receiving the indicia of the electrical property from the electrical load or a third-party device. A control operation 230 includes biasing a gating electrode of the controllable cell in response to the indicia of the electrical property of the electrical load. In an embodiment, the control operation may be implemented by the control unit biasing the gating electrode 140 described in conjunction with FIG. 1 in response to the indicia of the electrical property of the electrical load. The operational flow includes an end operation. The controllable cell is configured to output electric power and includes a working electrode configured to transfer electrons to or from an electrolyte of the controllable cell. The gating electrode is spaced-apart from the working electrode and configured if biased relative to the working electrode to modify an electric charge, field, or potential in the space between the electrolyte and the working electrode.

In an alternative embodiment, the operational flow 200 includes a connection operation 210. The connection operation includes coupling the controllable electrochemical cell to the electrical load. In an embodiment, the connection operation may be implemented by connecting terminal electrodes of the controllable cell 110 with the external load 190 described in conjunction with FIG. 1.

In an embodiment, the reception operation 220 includes receiving data indicative of a current draw or a voltage drop across output terminal electrodes of the controllable cell coupled with the electrical load. In an embodiment, the reception operation includes receiving indicia of an electric power requirement of the electrical load. In an embodiment, the reception operation includes receiving indicia of a condition of the electrical load. In an embodiment, the reception operation includes receiving timing data or synchronization data related to the electrical load.

In an embodiment, the control operation 230 includes applying a voltage bias to the gating electrode facilitating or accelerating a release or movement of electrons from the working electrode and into the electrolyte. In an embodiment, the control operation includes applying a voltage bias to the gating electrode facilitating or accelerating a capture or movement of electrons into the working electrode from the electrolyte. In an embodiment, the control operation includes applying a voltage bias to the gating electrode retarding or inhibiting a release or movement of electrons from the working electrode and into the electrolyte. In an embodiment, the control operation includes applying a voltage bias to the gating electrode retarding or inhibiting a capture or movement of electrons from the electrolyte and into the working electrode.

In an embodiment, the reception operation 220 includes receiving indicia of a high electric power output requirement from the controllable cell. For example, the indicia may be for an immediate or a future high electric power output requirement. For example, a high electric power requirement may include a substantially maximum current output from the controllable cell. In an embodiment, the control operation 230 includes applying a voltage bias to the gating electrode facilitating a release or movement of electrons from the working electrode and into the electrolyte in response to the received indicia of a high electric power output requirement from the controllable cell. In an alternative embodiment where the controllable cell configuration includes the working electrode capturing electrons instead of emitting electrons as illustrated in FIG. 1, the control operation would apply a voltage bias to the gating electrode facilitating a capture or movement of electrons from the electrolyte and into the working electrode electrolyte in response to the received indicia of a high electric power output requirement from the controllable cell. In an embodiment, the reception operation includes receiving indicia indicative of a minimal electric power output requirement by the controllable cell. For example, a minimal electric power requirement may include a near or substantially zero electric power output requirement. In an embodiment, the control operation includes applying a voltage bias to the gating electrode retarding or inhibiting a release or movement of electrons from the working electrode and into the electrolyte in response to the received indicia a minimal electric power output requirement by the controllable cell.

In an embodiment, the reception operation 220 includes receiving indicia of an increased current draw or a voltage drop across output terminal electrodes of the controllable cell. For example, the increased current draw or voltage drop may occur because the current drawn from controllable cell exceeds an operating parameter, with a possible consequence to the controllable cell becoming too hot or otherwise damaged. In an embodiment, the control operation 230 includes applying a voltage bias to the gating electrode retarding or inhibiting a release or movement of electrons from the working electrode and into the electrolyte in response to the received indicia of an increased current draw or a voltage drop. For example, such biasing is expected to reduce the power outputted by the controllable cell in the presence of a short circuit or overheating.

Figure 3:
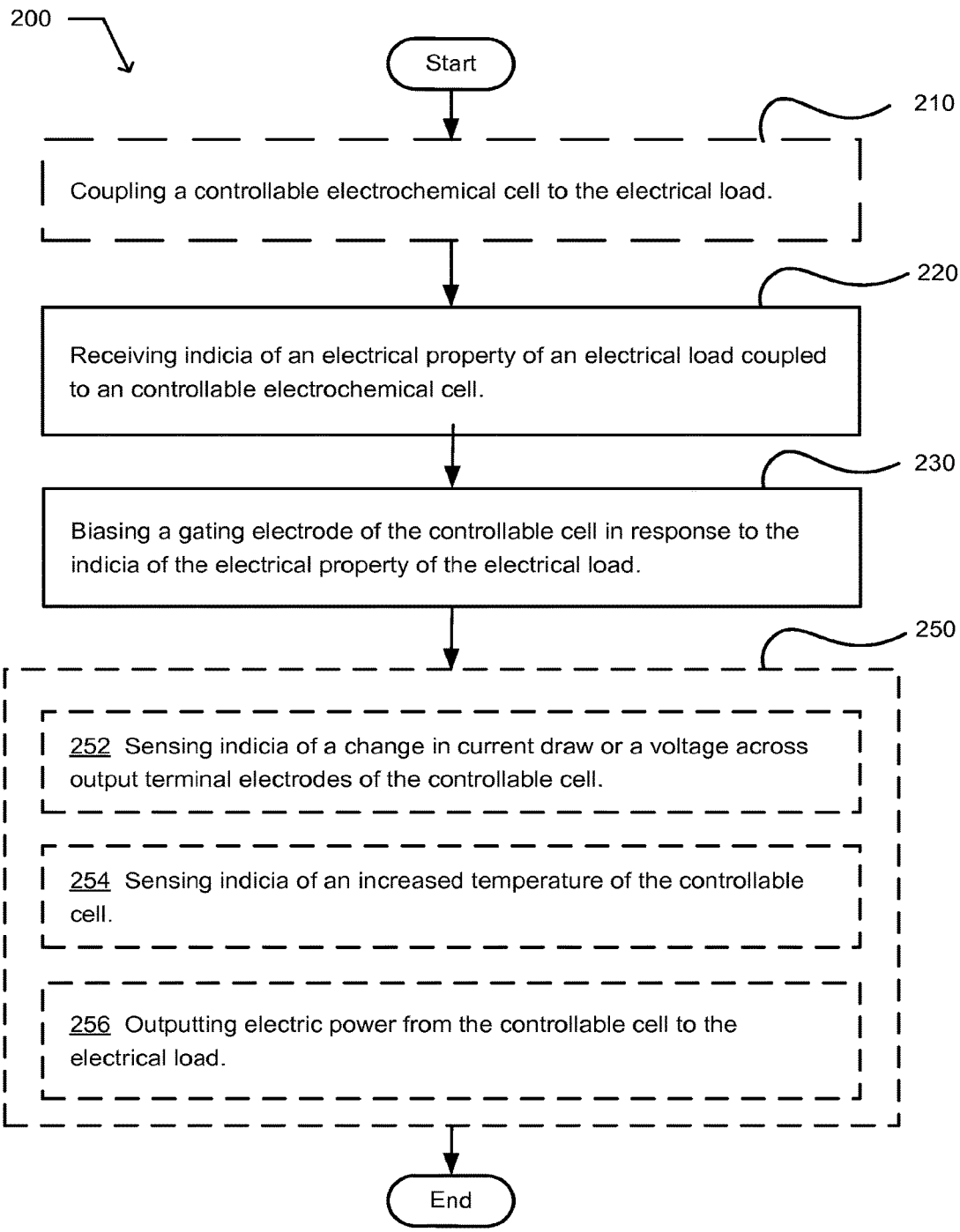
FIG. 3 illustrates an alternative embodiment of the operational flow 200 of FIG. 2.

FIG. 3 illustrates an alternative embodiment of the operational flow 200 of FIG. 2. The alternative embodiment may include at least one additional operation 250. The at least one additional operation may include an operation 252 sensing indicia of a change in current draw or a voltage across output terminal electrodes of the controllable cell. In this embodiment, the reception operation 220 may include receiving the sensed indicia of a change in current draw or a voltage across the output terminal electrodes of the controllable cell. In this embodiment, the control operation 230 may include applying a voltage bias to the gating electrode facilitating a release or movement of electrons from the working electrode and into the electrolyte in response to the received indicia of a change in current draw or a voltage. Application of such voltage bias is expected to increase current output by the controllable cell in a configuration where the working electrode is emitting electrons. In this embodiment, the control operation may include applying a voltage bias to the gating electrode retarding or inhibiting a release or movement of electrons from the working electrode and into the electrolyte in response to the received indicia of a change in current draw or a voltage. Application of such voltage bias is expected to decrease current output by the controllable cell in a configuration where the working electrode is capturing electrons. In this embodiment, the control operation may include applying a voltage bias to the gating electrode retarding or inhibiting a release or movement of electrons from the working electrode and into the electrolyte in response to a received sensed indicia of an increased temperature of the controllable cell. In an embodiment, the sensing includes sensing indicia of an increased temperature of the electrolyte of the controllable cell or a voltage drop across the controllable cell. For example, such application is expected to reduce power output from the controllable cell in the presence of a short or overheating.

The at least one additional operation may include an operation 254 sensing indicia of an increased temperature of the controllable cell. In an alternative embodiment, the operation 254 may include sensing indicia of an increased temperature of the electrolyte of the controllable cell or a voltage drop across the controllable cell. In this embodiment, the control operation may include applying a voltage bias to the gating electrode retarding or inhibiting a release or movement of electrons from the working electrode and into the electrolyte in response to a received sensed indicia of an increased temperature of the controllable cell. The at least one additional operation may include an operation 256 outputting electric power from the controllable cell to the electrical load.

Figure 4:
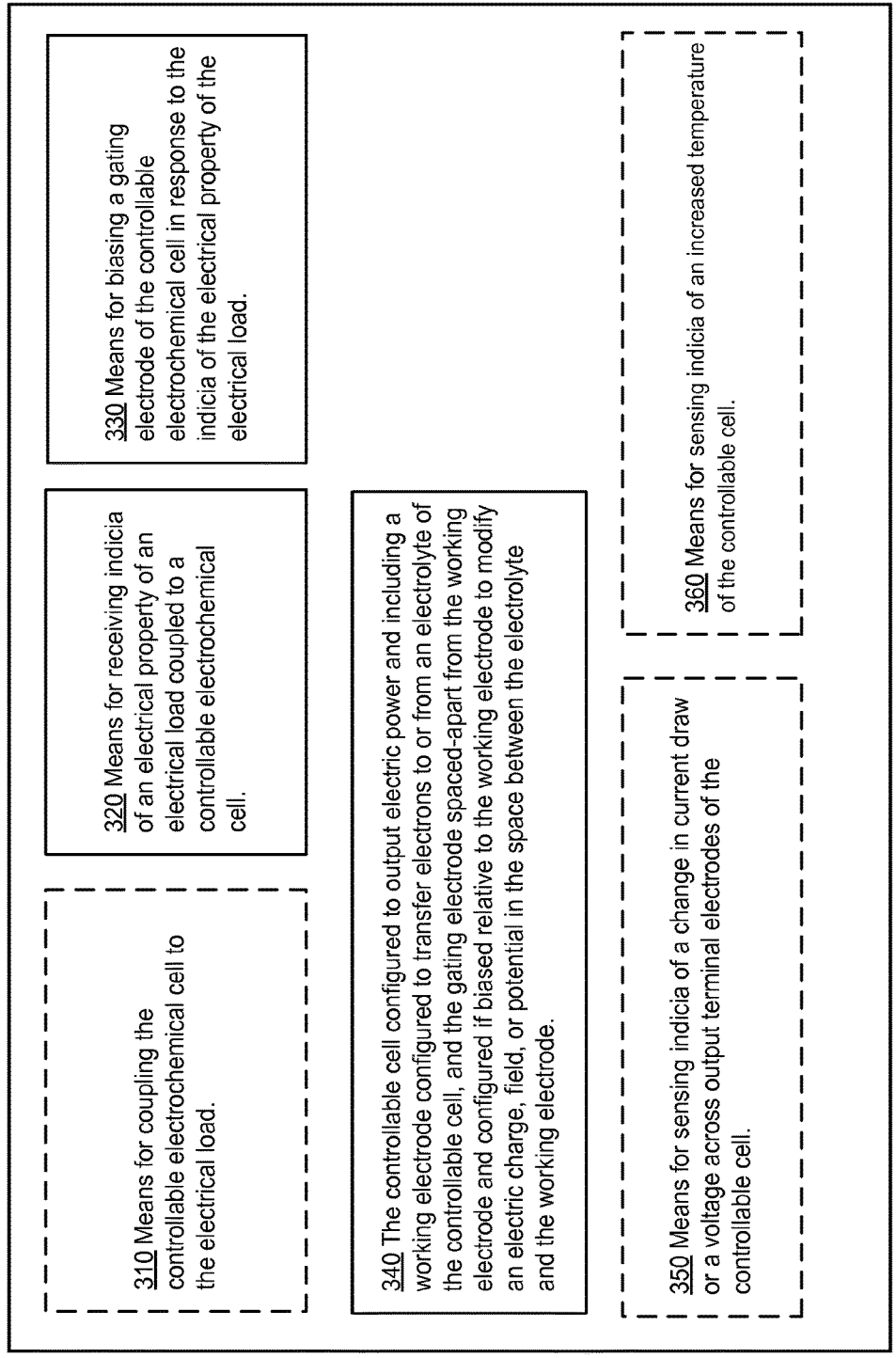
FIG. 4 illustrates an example system 300.

FIG. 4 illustrates an example system 300. The system includes means 310 for coupling a controllable electrochemical cell configured to output electric power to an electrical load. The system includes means 320 for receiving indicia of an electrical property of an electrical load coupled to a controllable electrochemical cell. The system includes means 330 for biasing a gating electrode of the controllable electrochemical cell 340 in response to the indicia of the electrical property of the electrical load. The controllable cell is configured to output electric power and includes a working electrode configured to transfer electrons to or from an electrolyte of the controllable cell. The gating electrode is spaced-apart from the working electrode and configured if biased relative to the working electrode to modify an electric charge, field, or potential in the space between the electrolyte and the working electrode.

In an embodiment, the system 300 includes means 310 for coupling the controllable electrochemical cell to the electrical load. In an embodiment, the system includes means 350 for sensing indicia of a change in current draw or a voltage across output terminal electrodes of the controllable cell. In an embodiment, the system includes means 360 for sensing indicia of an increased temperature of the controllable cell.

Figure 5:
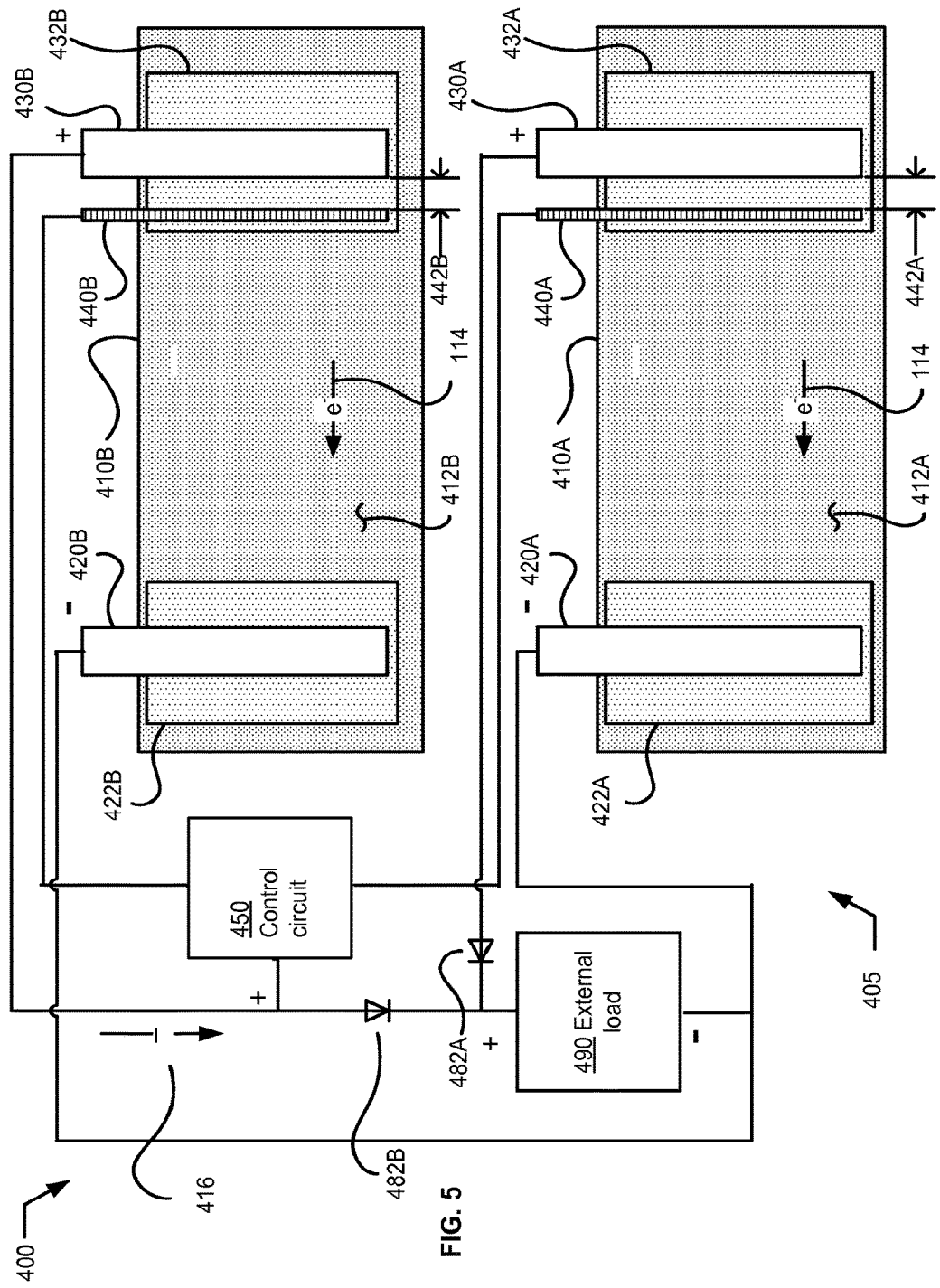
FIG. 5 schematically illustrates an environment 400 in which embodiments may be implemented.

FIG. 5 schematically illustrates an environment 400 in which embodiments may be implemented. The environment includes an external load 490 and a system 405. The system includes at least two individually controllable electrochemical cells configured to output electric power. A first individually controllable cell is illustrated as controllable cell 410A, and a second controllable cell is illustrated as controllable cell 410B. Each individually controllable cell includes an electrolyte, illustrated as first electrolyte 412A and second electrolyte 412B. Each individually controllable cell includes first working electrode configured to transfer electrons to or from the electrolyte, respectively illustrated as a working electrode 420A located in an interfacial region 422A in the first electrolyte and a working electrode 420B located in an interfacial region 422B in the second electrolyte. Each individually controllable cell includes second working electrode configured to transfer electrons to or from the electrolyte, respectively illustrated as a working electrode 430A located in an interfacial region 432A in the first electrolyte and a working electrode 430B located in an interfacial region 432B in the second electrolyte. Each individually controllable cell includes a gating electrode spaced-apart from the second working electrode and configured if biased relative to the second working electrode to modify an electric charge, field, or potential in the space between the electrolyte and the second working electrode. The gating electrode is respectively illustrated as a gating electrode 440A spaced-apart 442A from the second electrode 440A and a gating electrode 440B spaced-apart 442B from the second electrode 440B. In an embodiment, the gating electrodes are respectively interposed in the electrolyte in a path of electron flow between the first working electrode and the second working electrode. The system includes a control circuit 450 coupled to apply a respective biasing signal to each gating electrode of each controllable cell of the at least two controllable cells. In an embodiment of the system, one or more blocking devices may be used to prevent a reverse current flowing from one controllable cell to another controllable cell of the at least two controllable cells. For example, FIG. 5 illustrates reverse current protection respectively provided by devices 482A and 482B to controllable cell 410A and 410B. For example, a blocking device may include an electronic component. For example, the blocking device may include a diode. For example, the blocking device may include a FET or MOSFET.

In an embodiment of the system 405, the at least two controllable cells are each configured to store or output electrical power. In an embodiment of the system, a first controllable cell of the at least two controllable cells has a property that is different from the property of a second controllable cell of the at least two controllable cells. For example, a property may include an age, voltage, discharge capacity, internal impedance, or charge level. In an embodiment, a first controllable cell of the at least two controllable cells has a higher discharge rate relative to a discharge rate of the second controllable cell of the at least two controllable cells. For example, pairing a fast, high discharge rate controllable cell with a low discharge rate, high capacity controllable cell may allow the combined output current 416 to have a waveform with sharp edges or rapid transitions, such as a square wave or pulse train. In an embodiment, a first controllable cell of the at least two controllable cells has a higher discharge state relative to a discharge state of the second controllable cell of the at least two controllable cells. In an embodiment, a first controllable cell of the at least two controllable cells has a higher recharge rate relative to a recharge rate of the second controllable cell of the at least two controllable cells. For example, both controllable cells may have a same capacity, but one recharges faster because of age or another factor or parameter. For example, the first controllable cell may have a different capacity or chemistry than the second controllable cell, and thus have difference recharge rates. In an embodiment, "capacity" describes an ability of a controllable cell to store electric charge. In an embodiment, a first controllable cell of the at least two controllable cells has a higher available capacity relative to an available capacity of the second controllable cell of the at least two controllable cells. In an embodiment, a first controllable cell of the at least two controllable cells is optimized for capacity and a second controllable cell of the at least two controllable cells is optimized for power. In an embodiment, a controllable cell optimized for power includes a controllable cell optimized to discharge current at a high C value, or to deliver high current pulses. In an embodiment, a first controllable cell of the at least two controllable cells has a first expected working life and the second controllable cell of the at least two controllable cells has a second expected working life. In an embodiment, a first controllable cell of the at least two controllable cells has a first operational cost and the second controllable cell of the at least two controllable cells has a second operational cost. In an embodiment, a first controllable cell of the at least two controllable cells has a first remaining useful life and the second controllable cell of the at least two controllable cells has a second remaining useful life. For example, a remaining useful life may be a projected remaining useful life, or an estimated useful life based upon a measured property of the controllable cell.

In an embodiment of the system 405, the respective biasing signals are generated by the control circuit 450 responsive to the property of a controllable cell 410A of the at least two controllable cells and the property of a controllable cell 410B of the at least two controllable cells. In an embodiment, property includes a characteristic, or a parameter of a controllable cell. For example, a first biasing signal to the gating electrode 440A is responsive to a property of the controllable cell 410A, and a second biasing signal to the gating electrode 440B is responsive to a property of the controllable cell 410B. In an embodiment, the respective biasing signals may be responsive to the same property. In an embodiment, the respective biasing signals may be responsive to a property of the controllable cell 410A and another property of the controllable cell 410B.

In an embodiment, the respective biasing signals are generated by the control circuit 450 in response to an electrical property of an external electrical load 490 coupled to the at least two controllable cells 410A-410B. In an embodiment, the respective biasing signals are generated by the control circuit in response to an electric power requirement of the external electrical load coupled to the at least two controllable cells. In an embodiment, the respective biasing signals are generated by the control circuit in response to a condition of the external electrical load coupled to the at least two controllable cells. In an embodiment, the respective biasing signals are generated by the control circuit in response to an optimization algorithm that evaluates a respective impact on each of the at least two controllable cells in responding to the electrical property of the external electrical load. For example, the optimization algorithm may respectively evaluate at least one of heat, life, or efficiency of the at least two controllable cells 410A-410B in responding to the electrical property of the external electrical load. In an embodiment, the respective biasing signals are generated by the control circuit in response to an optimization algorithm that includes evaluating a respective impact on each of the at least two controllable cells in fulfilling an electric power requirement of the external electrical load. For example, the optimization algorithm may respond to a load, timing, or waveform requirement of the external electrical load.

In an embodiment, the external electrical load 490 may include load that absorbs power from the at least two controllable cells 410A-410B or supplies power to the at least two controllable cells in the case where they are rechargeable. In an embodiment, the external electrical load includes a current sink. For example, a current sink may include a resistive load. For example, a current sink may include an electronic device, such as a computing device. For example, a current sink may include an electric traction motor of an electric or hybrid vehicle. In an embodiment, the external electric load may include a current source. For example, a current source may include charging device charging or configured to recharge the electrochemical cell.

In an embodiment, the respective biasing signals are generated by the control circuit 450 in response to (i) a property of a first controllable cell 410A of the at least two controllable cells, (ii) a property of a second controllable cell 410B of the at least two controllable cells, and (iii) an electrical property of an external electrical load 490 coupled to the at least two controllable cells.

In an embodiment, the respective biasing signals are generated by the control circuit 450 in response to an arbitrary waveform requirement of an external electrical load 490 coupled to the at least two controllable cells 410A-410B. In an embodiment, the respective biasing signals include coordinating the respective output of electric power by the at least two controllable cells in meeting the arbitrary waveform requirement of the external electrical load. In an embodiment, the arbitrary waveform requirement of the external electrical load includes a DC wave having a peak of less than 6 volts. In an embodiment, the respective biasing signals are generated by the control circuit to collectively drive the at least two controllable cells to synthesize a particular waveform in electric power outputted to an external electric load. In an embodiment, the respective biasing signals are generated by the control circuit to provide regular, repetitive rest periods for each controllable cell of the at least two controllable cells.

In an embodiment, a first controllable cell 410A of the at least two controllable cells 410A-410B includes a rechargeable first controllable cell. In an embodiment, the at least two controllable cells are coupled to the external electrical load 490 in series. In an embodiment, the at least two controllable cells are coupled to the external electrical load in parallel. In an embodiment, the at least two controllable cells include at least four controllable cells. A first subset of the at least four controllable cells are coupled in a first series of controllable cells. A second subset of the at least four controllable cells are coupled in a second series of controllable cells, and the first subset of controllable cells and the second subset of controllable cells are coupled in parallel to an external electrical load.

Figure 6:
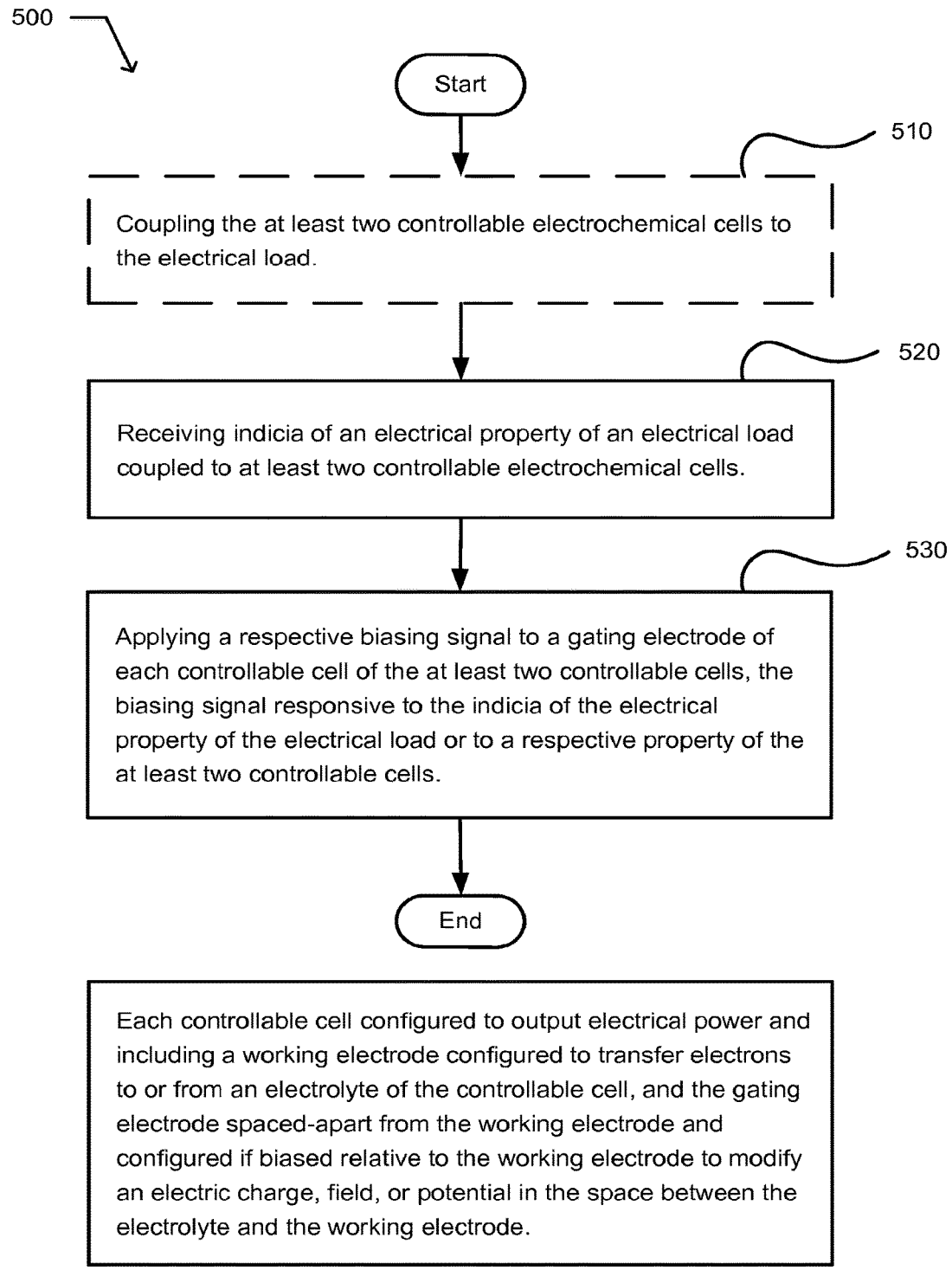
FIG. 6 illustrates an example operational flow 500.

FIG. 6 illustrates an example operational flow 500. After a start operation, the operational flow includes a reception operation 520. The reception operation includes receiving indicia of an electrical property of an electrical load coupled to at least two controllable electrochemical cells. In an embodiment, the reception operation may be implemented by the control circuit 450 described in conjunction with FIG. 5 receiving a result from a testing the external load 490 for the electrical property, or receiving the indicia of the electrical property from the electrical load or a third-party device. A control operation 530 includes applying a respective biasing signal to a gating electrode of each controllable cell of the at least two controllable cells. The biasing signal is responsive to the indicia of the electrical property of the electrical load or to a respective property of the at least two controllable cells. In an embodiment, the control operation may be implemented by the control unit biasing the gating electrodes 440A and 440B described in conjunction with FIG. 5 in response to the indicia of the electrical property of the electrical load. Each controllable cell is configured to output electrical power and includes a working electrode configured to transfer electrons to or from an electrolyte of the controllable cell. Each controllable cell includes the gating electrode spaced-apart from the working electrode and configured if biased relative to the working electrode to modify an electric charge, field, or potential in the space between the electrolyte and the working electrode. The operational flow includes an end operation.

In an embodiment, the operational flow 500 includes a connection operation 510. The connection operation includes coupling the at least two controllable electrochemical cells to the electrical load. In an embodiment, the connection operation may be implemented by connecting terminal electrodes of the at least two controllable cells 410A-410B with the external load 490 described in conjunction with FIG. 5. In an embodiment, the reception operation 520 includes receiving indicia of an electric power requirement of the electrical load. In an embodiment, the reception operation includes receiving indicia of a condition of the electrical load.

Figure 7:
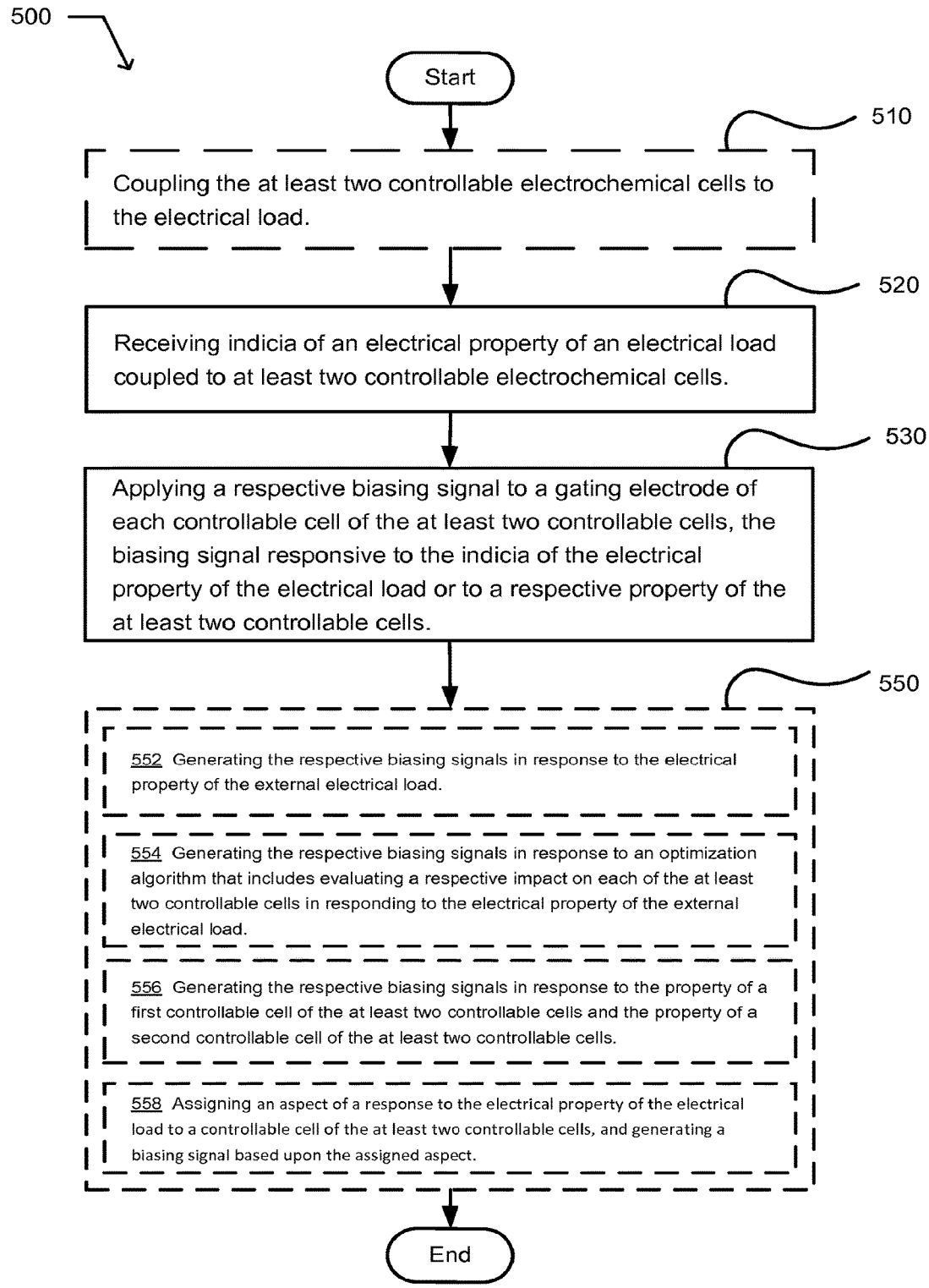
FIG. 7 illustrates an alternative embodiment of the operational flow 500 of FIG. 6.

FIG. 7 illustrates an alternative embodiment of the operational flow 500 of FIG. 6. In an embodiment, the operational flow may include at least one additional operation 550. The at least one additional operation may include an operation 552 generating the respective biasing signals in response to the electrical property of the external electrical load. In an embodiment, the generating includes generating the respective biasing signals in response to an electric power requirement of the external electrical load. In an embodiment, the generating includes generating the respective biasing signals in response to a condition of the external electrical load. In an embodiment, the generating includes generating the respective biasing signals in response to indicia of a current draw or a voltage drop across output terminal electrodes of the at least two controllable cells coupled with the electrical load. In an embodiment, the generating includes generating the respective biasing signals in response to an optimization algorithm that evaluates a respective impact on each of the at least two controllable cells in responding to the electrical property of the external electrical load.

The at least one additional operation 550 may include an operation 554 generating the respective biasing signals in response to an optimization algorithm that includes evaluating a respective impact on each of the at least two controllable cells in responding to the electrical property of the external electrical load. The at least one additional operation may include an operation 556 generating the respective biasing signals in response to the property of a first controllable cell of the at least two controllable cells and the property of a second controllable cell of the at least two controllable cells.

The at least one additional operation may include an operation 558 assigning an aspect of a response to the electrical property of the electrical load to a controllable cell of the at least two controllable cells, and generating a biasing signal based upon the assigned aspect. For example, the assignment of an aspect of the electrical property may include dividing out or parsing a response by the control operation 530 to the electrical property of the electrical load among the at least two controllable cells. For example, the assignment of an aspect of the electrical property may include decomposing or dividing a response by the control operation 530 to the electrical property of the electrical load into several aspects, and respectively assigning fulfillment of the several aspects across the at least two cells. In an embodiment, the assignment includes an assignment of at least two aspects of the electric power requirement among the at least two controllable cells in response to a respective impact on the at least two controllable cells in fulfilling the electric power requirement. In an embodiment, the assignment includes an assignment of at least two aspects of the electric power requirement among the at least two controllable cells in response to a respective property of the at least two controllable cells related to fulfilling the electric power requirement. In an embodiment, the assignment includes an assignment of at least two aspects of the electric power requirement among the at least two controllable cells in response to an optimization algorithm that includes evaluating a property of the at least two controllable cells. For example, the evaluated property may include cost, controllable cell life, or a likelihood of compliance with the electrical power requirement.

In an embodiment of the control operation 530, the biasing signal is responsive to the indicia of the electrical property of the electrical load and to a respective property of the at least two controllable cells.

Figure 8:
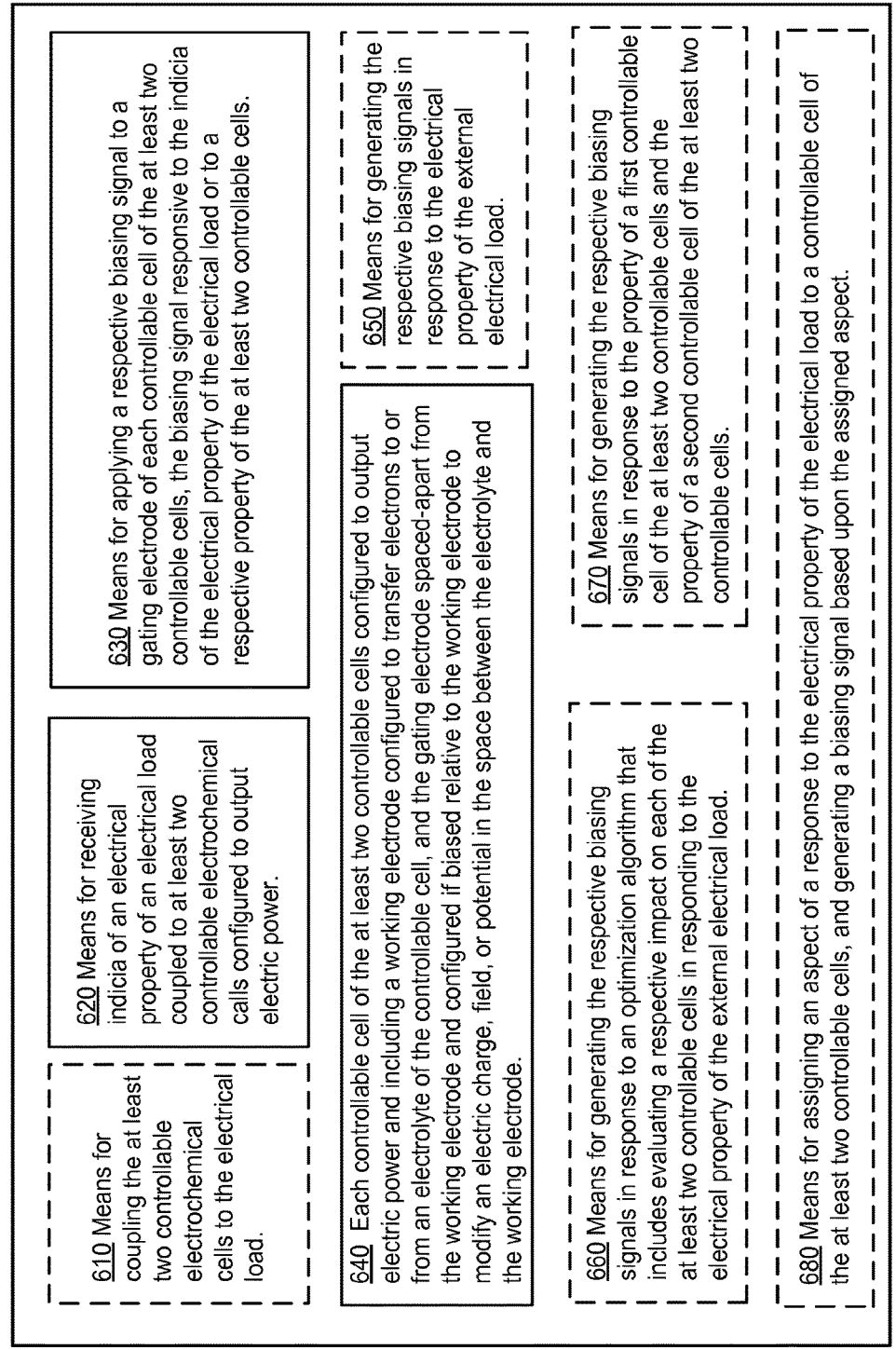
FIG. 8 illustrates an example system 600.

FIG. 8 illustrates an example system 600. The system includes means 620 for receiving indicia of an electrical property of an electrical load coupled to at least two controllable electrochemical cells configured to output electric power. The system includes means 630 for applying a respective biasing signal to a gating electrode of each controllable cell of the at least two controllable cells. The biasing signal is responsive to the indicia of the electrical property of the electrical load or to a respective property of the at least two controllable cells. Each controllable cell of the at least two controllable cells 640 is configured to output electric power and includes a working electrode configured to transfer electrons to or from an electrolyte of the controllable cell. The gating electrode is spaced-apart from the working electrode and configured if biased relative to the working electrode to modify an electric charge, field, or potential in the space between the electrolyte and the working electrode.

In an embodiment, the system 600 includes means 610 for coupling at least two controllable electrochemical cells to the electrical load. In an embodiment, the means 610 includes a means for coupling the at least two controllable cells in parallel to the electrical load. In an embodiment, the system 600 includes means 650 for generating the respective biasing signals in response to the electrical property of the external electrical load. In an embodiment, the system includes means 660 for generating the respective biasing signals in response to an optimization algorithm that includes evaluating a respective impact on each of the at least two controllable cells in responding the electrical property of the external electrical load. In an embodiment, the system includes means 670 for generating the respective biasing signals in response to the property of a first controllable cell of the at least two controllable cells and the property of a second controllable cell of the at least two controllable cells. In an embodiment, the system includes means 680 for assigning an aspect of a response to the electrical property of the electrical load to a controllable cell of the at least two controllable cells, and generating a biasing signal based upon the assigned aspect.

Figure 9:
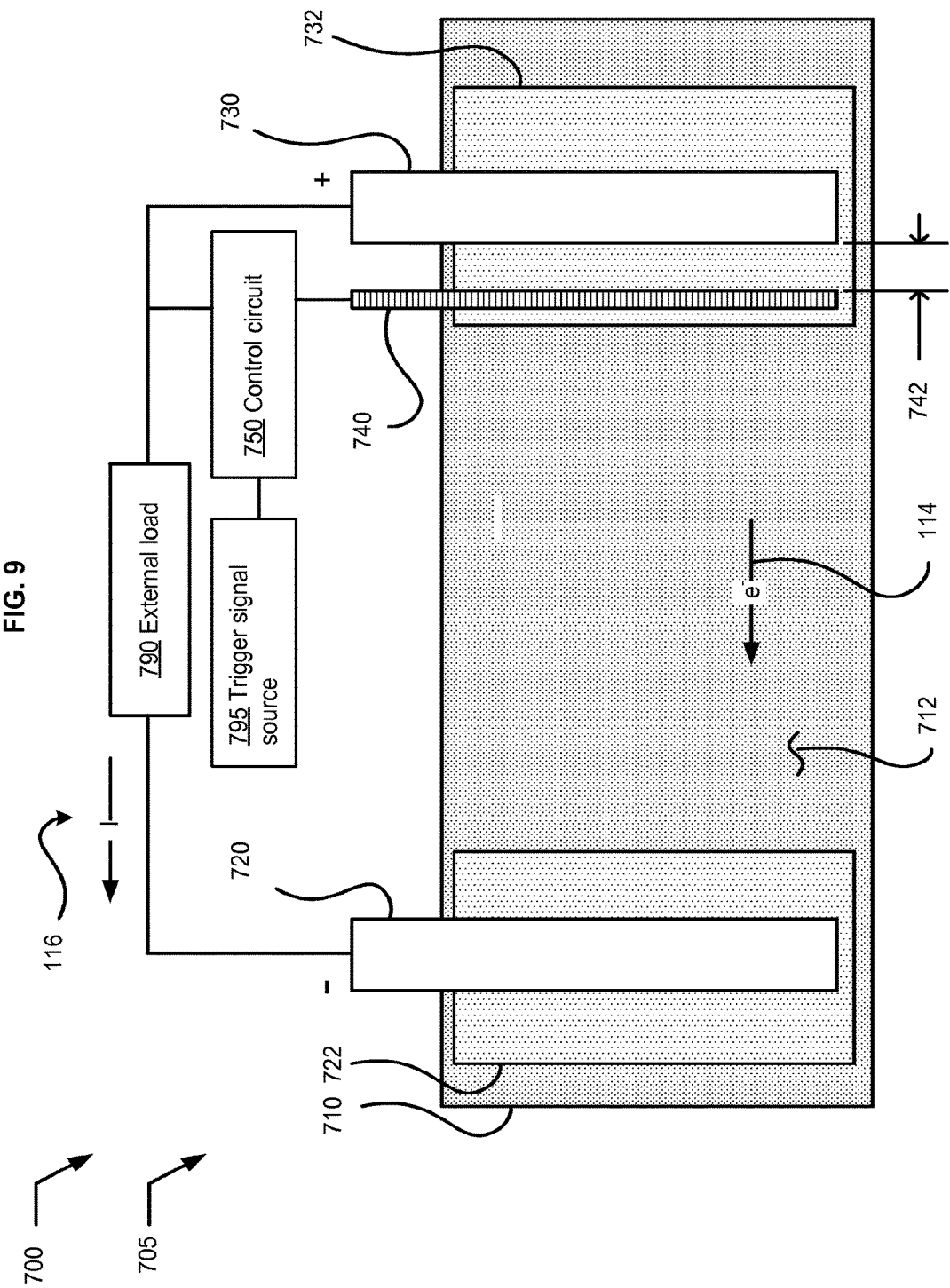
FIG. 9 schematically illustrates an environment 700 in which embodiments may be implemented.

FIG. 9 schematically illustrates an environment 700 in which embodiments may be implemented. The environment includes a system 705 and an external load 790. The system includes a controllable electrochemical cell configured to output electric power 710. The controllable cell is configured to output pulsed electric power. The controllable cell includes an electrolyte 712. The controllable cell includes a first working electrode 720 configured to transfer electrons 114 to or from the electrolyte. The controllable cell includes a second working electrode 730 configured to transfer electrons to or from the electrolyte. The controllable cell includes a gating electrode 740 spaced-apart 742 from the second working electrode. The gating electrode is configured if biased relative to the second working electrode to modify an electric charge, field, or potential in the space between the electrolyte and the second working electrode. The controllable cell includes a control circuit 750 configured to establish a nonlinear voltage-current property of the controllable cell in response to an externally originated trigger signal. For example, a controllable cell configured to output pulsed electric power may have a high electrode area, and a small gap between the first and second working electrodes. In an embodiment, the first working electrode is in a first interfacial region 722 of the electrolyte proximate to the first working electrode. In an embodiment, the second working electrode is in a second interfacial region 732 of the electrolyte proximate to the second working electrode.

In an embodiment of the system 705, the controllable cell is configured to store electrical power or output pulsed electric power. In an embodiment, the first working electrode 720, the second working electrode 730, and the gating electrode 740 are configured in combination to output electrical power having a nonlinear voltage-current property. In an embodiment, the first working electrode, the second working electrode, the gating electrode, and the control circuit are configured so that the system is capable of outputting electrical power having a nonlinear voltage-current property to an attached electrical load. In an embodiment, the nonlinear voltage-current property includes a bi-stable current source property. In an embodiment, the bi-stable current property includes a behavior at least substantially similar to a thyristor. For example, a thyristor behavior may include a configuration to operate as a bi-stable current source, or a configuration to operate as a nonlinear current source. In an embodiment of the system 705, the establishment of a nonlinear voltage current property in the controllable cell 710 also establishes a nonlinear voltage current property in one or more other cells coupled to the controllable cell 710 in series.

In an embodiment, the controllable cell 710 is configured to allow a drain rate greater than 2 C without overheating or damage. In an embodiment, the controllable cell is configured to allow a drain rate greater than 4 C without overheating or damage. In an embodiment, the controllable cell is configured to allow a drain rate greater than 12 C without overheating or damage.

In an embodiment, the control circuit 750 includes a control circuit configured to provide a feedback connection between the second working electrode 730 and the gating electrode 740 of the controllable cell 710. The feedback connection is configured to establish a nonlinear voltage-current property of the controllable cell in response to an externally originated trigger signal. In an embodiment, the controllable cell is configured to (i) accelerate or facilitate a release or movement of electrons 114 from the second electrode and into the electrolyte 712 in response to application of a first voltage bias to the gating electrode, and (ii) retard or inhibit the release or movement of electrons from the second electrode and into the electrolyte in response to application of a second voltage bias to the gating electrode. In an embodiment, the control circuit is configured to apply the first voltage bias to the gating electrode or the second voltage bias to the gating electrode in response to an externally originated trigger signal. In an embodiment, the controllable cell is configured to (i) output a high current by accelerating or facilitating a release or movement of electrons from the second electrode and into the electrolyte in response to application of a first voltage bias to the gating electrode, and (ii) output only a minimal or substantially zero current by retarding or inhibiting the release or movement of electrons from the second electrode and into the electrolyte in response to application of a second voltage bias to the gating electrode. In an embodiment, the control circuit is configured to apply the first voltage bias to the gating electrode or the second voltage bias to the gating electrode in response to an externally originated trigger signal.

In an embodiment, the externally originated trigger signal is originated by an external load 790 coupled with the controllable cell 710. In an embodiment, the externally originated trigger signal is originated by a trigger signal source 795 other than an external load coupled with the controllable cell.

Figure 10:
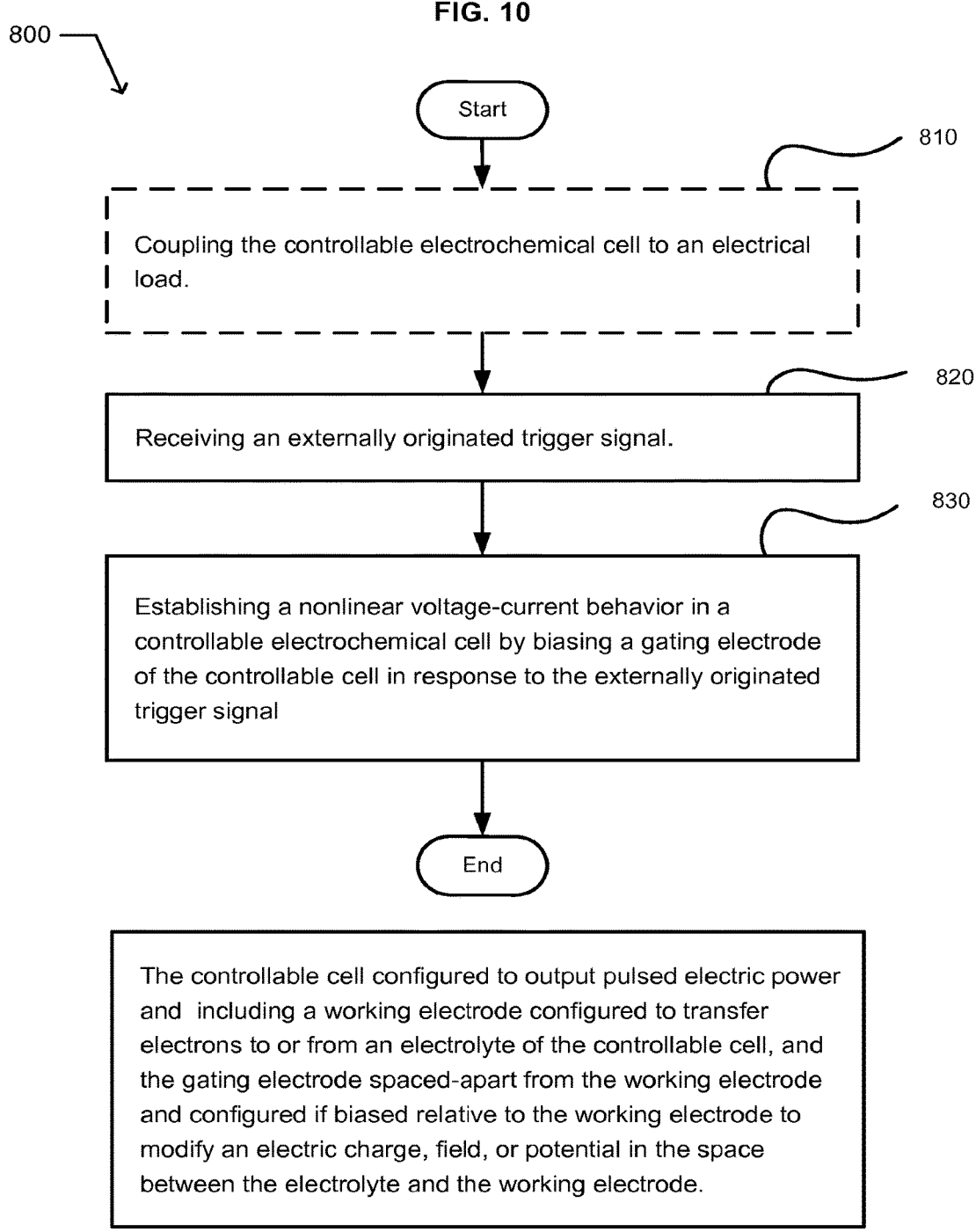
FIG. 10 illustrates an example operational flow 800.

FIG. 10 illustrates an example operational flow 800. After a start operation, the operational flow includes a reception operation 820. The reception operation includes receiving an externally originated trigger signal. In an embodiment, the reception operation may be implemented by the control circuit 750 receiving an externally originated trigger signal from either the external load or the trigger signal source 795 described in conjunction with FIG. 9. A control operation 830 includes establishing a nonlinear voltage-current behavior in a controllable electrochemical cell by biasing a gating electrode of the controllable cell in response to the externally originated trigger signal. In an embodiment, the control operation may be implemented by the control circuit 750 biasing the gating electrode 740 as described in conjunction with FIG. 9. The controllable cell is configured to output pulsed electric power and includes a working electrode configured to transfer electrons to or from an electrolyte of the controllable cell. The controllable cell includes a gating electrode spaced-apart from a working electrode, and is configured if biased relative to the working electrode to modify an electric charge, field, or potential in the space between the electrolyte and the working electrode. The operational flow includes an end operation.

An embodiment of the operational flow 800 includes a connecting operation 810, which includes coupling the controllable electrochemical cell to an electrical load. In an embodiment, the connecting operation may be implemented by coupling the controllable cell 710 with the external load 790 described in conjunction with FIG. 9. In an embodiment of the control operation 830, the establishing a nonlinear voltage-current behavior includes establishing a first nonlinear voltage-current behavior by applying a first voltage bias to the gating electrode. The first voltage bias is selected to accelerate or facilitate a release or movement of electrons from the second electrode and into the electrolyte in response to a first externally originated trigger signal. In an embodiment, the establishing a nonlinear voltage-current behavior includes establishing a high current output from the controllable cell by applying a first voltage bias to the gating electrode. The first voltage bias is selected to accelerate or facilitate a release or movement of electrons from the second electrode and into the electrolyte in response to a first externally originated trigger signal. In an embodiment, the establishing a nonlinear voltage-current behavior includes establishing a second nonlinear voltage-current behavior by applying a second voltage bias to the gating electrode. The second voltage bias is selected to retard or inhibit a release or movement of electrons from the second electrode and into the electrolyte in response to a second externally originated trigger signal. In an embodiment, the establishing a nonlinear voltage-current behavior includes establishing a low or substantially zero current output from the controllable cell by applying a second voltage bias to the gating electrode. The second voltage bias is selected to retard or inhibit a release or movement of electrons from the second electrode and into the electrolyte in response to a second externally originated trigger signal.

Figure 11:
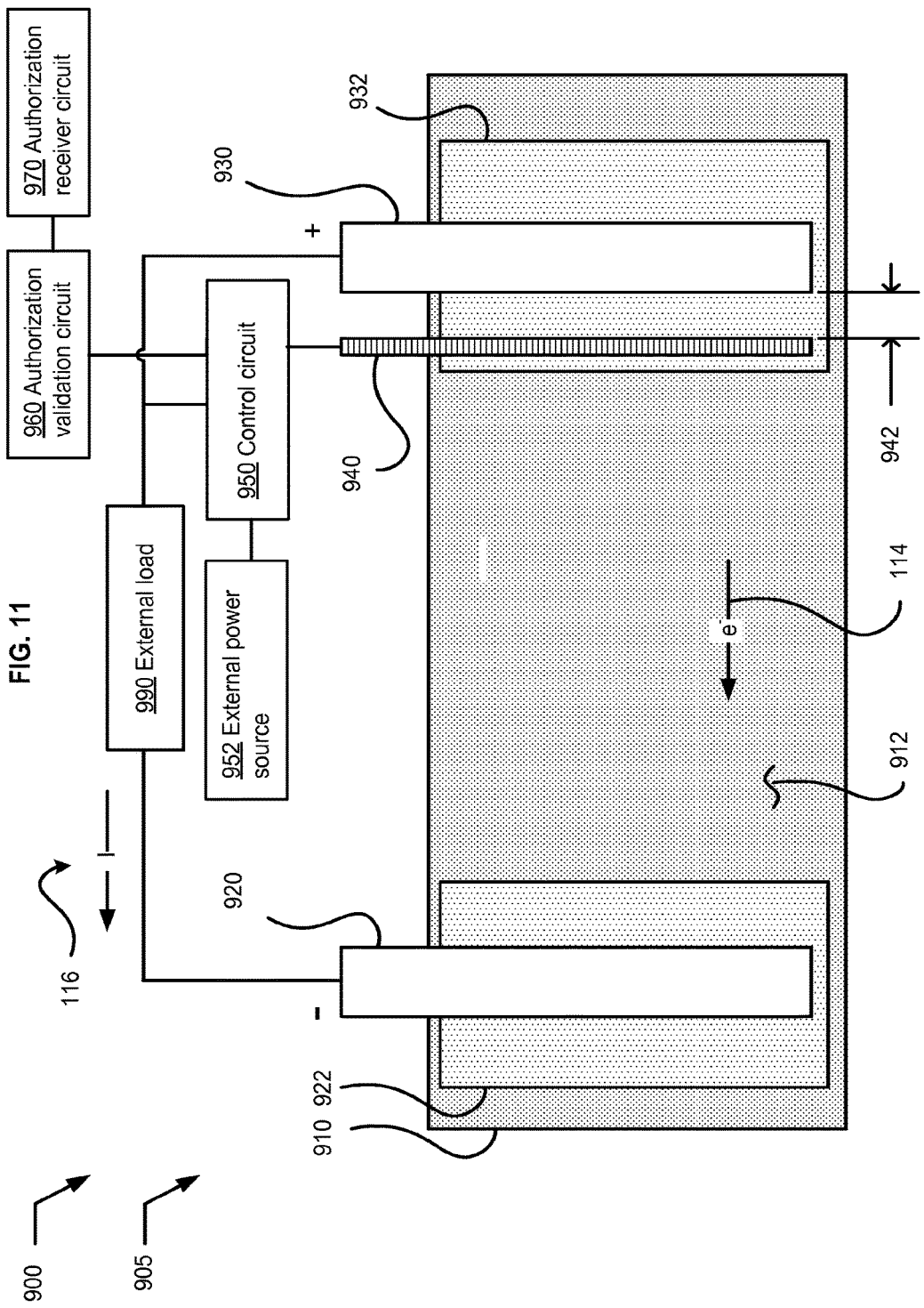
FIG. 11 schematically illustrates an environment 900.

FIG. 11 schematically illustrates an environment 900. The environment includes a system 905 and an external load 990. The system includes a controllable electrochemical cell 910 configured to output electric power. The controllable cell includes an electrolyte 912. The controllable cell includes first working electrode 920 configured to transfer electrons 114 to or from the electrolyte. The controllable cell includes a second working electrode 930 configured to transfer electrons to or from the electrolyte. The controllable cell includes a gating electrode 940 spaced-apart 942 from the second working electrode. The gating electrode configured if biased relative to the second working electrode to modify an electric charge, field, or potential in the space between the electrolyte and the second working electrode. The gating electrode and the second working electrode of the controllable cell are configured so that the controllable cell provides a voltage or current greater than a limited value to an external electrical load coupled to the controllable cell only if the gating electrode is appropriately biased. In an embodiment, the first working electrode is in a first interfacial region 922 of the electrolyte proximate to the first working electrode. In an embodiment, the second working electrode is in a second interfacial region 932 of the electrolyte proximate to the second working electrode.

In an embodiment, the controllable cell 910 includes a controllable electrochemical cell configured to store or output electric power. in conjunction with a request for electric power from the controllable electrochemical cell. In an embodiment, the system 905 includes a control circuit 950 coupled to the gating electrode 940, and configured to apply the appropriate bias to the gating electrode only if a valid use authorization is received. In an embodiment, the control circuit is configured to apply the appropriate bias from an external power 952 source to the gating electrode only if a valid use authorization is received. In an embodiment, the use authorization relates to a safety condition having been met. In an embodiment, the use authorization relates to an absence of an alarm condition. In an embodiment, the use authorization includes receipt of a valid user-specific key. In an embodiment, the user-specific key is configured to allow only a specific authorized user to operate the controllable cell. In an embodiment, the user-specific key is configured to authorize only a specific user of at least two registered users to operate the controllable cell. In an embodiment, the user-specific key authorizes a specific user to control output of the controllable cell. In an embodiment, the user-specific key authorizes a specific user to draw power from the controllable cell only up to a particular specified limit.

In an embodiment, the system 905 includes an authorization validation circuit 960 configured to determine if a valid use authorization is received. In an embodiment, the system includes an authorization receiver circuit 970 configured to receive a tendered use authorization. For example, the tendered use authorization may be tendered by an individual human or by a machine.

FIG. 12 illustrates an example operational flow 1000. After a start operation, the operational flow includes a reception operation 1020. The reception operation includes receiving a use authorization tendered in conjunction with a request for electric power from a controllable electrochemical cell. In an embodiment, the reception operation may be implemented by the authorization receiver circuit 970 described in conjunction with FIG. 11. A confirmation operation 1030 includes determining that the tendered use authorization is valid. In an embodiment, the confirmation operation may be implemented by the authorization validation circuit 960 described in conjunction with FIG. 11. A control operation 1040 includes applying an appropriate bias to a gating electrode of the controllable cell so that the controllable cell provides electric power greater than a limited value. The controllable cell is configured to output electric power and includes a working electrode configured to transfer electrons to or from an electrolyte of the controllable cell. The gating electrode is spaced-apart from the working electrode, and configured if appropriately biased relative to the working electrode to provide a voltage or current greater than a limited value to the external electrical load by modifying an electric charge, field, or potential in the space between the electrolyte and the working electrode. The operational flow includes an end operation.

In an embodiment, the operational flow 1000 includes a connecting operation 1010. The connecting operation includes coupling the controllable electrochemical cell to the external electrical load. In an embodiment, the connecting operation may be implemented by connecting the controllable cell 910 with the external load 990 described in conjunction with FIG. 11. In an embodiment of the reception operation 1020, the receiving includes receiving a tendered use authorization related to a safety condition having been met. For example, the safety condition may include a fitness or suitability of the external load to receive electric power outputted by the controllable cell. For example, the safety condition may include a fitness or readiness of the controllable cell to output electric power to the external load. For example, the tendered use authorization may be received from the external electrical load or from a user via an authorization receiver circuit. In an embodiment, the receiving includes receiving a tendered use authorization related to an absence of an alarm condition. In an embodiment, the receiving includes receiving a tendered user-specific key.

In an embodiment of the confirmation operation 1030, the determining includes determining that the tendered use authorization is valid in response to a library of at least two valid use authorizations.

In an embodiment of the control operation 1040, the applying an appropriate bias includes applying an appropriate bias supplied by an external power source to the gating electrode. For example, the external power source may include a power source incorporated in the control circuit, or a separate external power source, such as the external power source 952 described in conjunction with FIG. 11.

All references cited herein are hereby incorporated by reference in their entirety or to the extent their subject matter is not otherwise inconsistent herewith.

In some embodiments, "configured" includes at least one of designed, set up, shaped, implemented, constructed, or adapted for at least one of a particular purpose, application, or function.

It will be understood that, in general, terms used herein, and especially in the appended claims, are generally intended as "open" terms. For example, the term "including" should be interpreted as "including but not limited to." For example, the term "having" should be interpreted as "having at least." For example, the term "has" should be interpreted as "having at least." For example, the term "includes" should be interpreted as "includes but is not limited to," etc. It will be further understood that if a specific number of an introduced claim recitation is intended, such an intent will be explicitly recited in the claim, and in the absence of such recitation no such intent is present. For example, as an aid to understanding, the following appended claims may contain usage of introductory phrases such as "at least one" or "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a receiver" should typically be interpreted to mean "at least one receiver"); the same holds true for the use of definite articles used to introduce claim recitations. In addition, even if a specific number of an introduced claim recitation is explicitly recited, it will be recognized that such recitation should typically be interpreted to mean at least the recited number (e.g., the bare recitation of "at least two chambers," or "a plurality of chambers," without other modifiers, typically means at least two chambers).

In those instances where a phrase such as "at least one of A, B, and C," "at least one of A, B, or C," or "an [item] selected from the group consisting of A, B, and C," is used, in general such a construction is intended to be disjunctive (e.g., any of these phrases would include but not be limited to systems that have A alone, B alone, C alone, A and B together, A and C together, B and C together, or A, B, and C together, and may further include more than one of A, B, or C, such as A.sub.1, A.sub.2, and C together, A, B.sub.1, B.sub.2, C.sub.1, and C.sub.2 together, or B.sub.1 and B.sub.2 together). It will be further understood that virtually any disjunctive word or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The herein described aspects depict different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality. Any two components capable of being so associated can also be viewed as being "operably couplable" to each other to achieve the desired functionality. Specific examples of operably couplable include but are not limited to physically mateable or physically interacting components or wirelessly interactable or wirelessly interacting components.

With respect to the appended claims the recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Use of "Start," "End," "Stop," or the like blocks in the block diagrams is not intended to indicate a limitation on the beginning or end of any operations or functions in the diagram. Such flowcharts or diagrams may be incorporated into other flowcharts or diagrams where additional functions are performed before or after the functions shown in the diagrams of this application. Furthermore, terms like "responsive to," "related to," or other past-tense adjectives are generally not intended to exclude such variants, unless context dictates otherwise.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method comprising:
   receiving indicia of an electrical property of an electrical load coupled to a controllable cell; and
   biasing a gating electrode of the controllable cell in response to the indicia of the electrical property of the electrical load, the controllable cell configured to output electric power and including a working electrode configured to transfer electrons to or from an electrolyte of the controllable cell, and the gating electrode spaced-apart from the working electrode and configured if biased relative to the working electrode to modify an electric charge, field, or potential in the space between the electrolyte and the working electrode.

2. The method of claim 1, wherein the receiving includes receiving indicia indicative of a current draw or a voltage drop across output terminal electrodes of the controllable cell coupled with the electrical load.

3. The method of claim 1, wherein the receiving includes receiving indicia of an electric power requirement of the electrical load.

4. The method of claim 1, wherein the receiving includes receiving indicia of a condition of the electrical load.

5. The method of claim 1, wherein the receiving indicia includes receiving timing data or synchronization data related to the electrical load.

6. The method of claim 1, wherein the biasing includes applying a voltage bias to the gating electrode facilitating or accelerating a release or movement of electrons from the working electrode and into the electrolyte.

7. The method of claim 1, wherein the biasing includes applying a voltage bias to the gating electrode facilitating or accelerating a capture or movement of electrons into the working electrode from the electrolyte.

8. The method of claim 1, wherein the biasing includes applying a voltage bias to the gating electrode retarding or inhibiting a release or movement of electrons from the working electrode and into the electrolyte.

9. The method of claim 1, wherein the biasing includes applying a voltage bias to the gating electrode retarding or inhibiting a capture or movement of electrons from the electrolyte and into the working electrode.

10. The method of claim 1, wherein the receiving includes receiving indicia indicative of a high electric power output requirement from the controllable cell.

11. The method of claim 10, wherein the biasing includes applying a voltage bias to the gating electrode facilitating a release or movement of electrons from the working electrode and into the electrolyte in response to the received indicia of a high electric power output requirement from the controllable cell.

12. The method of claim 1, wherein the receiving includes receiving indicia of a minimal electric power output requirement from the controllable cell.

13. The method of claim 1, further comprising: coupling the controllable electrochemical cell to the electrical load.

14. The method of claim 1, further comprising: sensing indicia of a change in current draw or a voltage across output terminal electrodes of the controllable cell.

15. The method of claim 14, wherein the receiving includes receiving the sensed indicia of a change in current draw or a voltage across the output terminal electrodes of the controllable cell.

16. The method of claim 1, further comprising: sensing indicia of an increased temperature of the controllable cell.

17. The method of claim 16, wherein the sensing includes sensing indicia of an increased temperature of the electrolyte of the controllable cell or a voltage drop across the controllable cell.

18. The method of claim 16, wherein the biasing includes applying a voltage bias to the gating electrode retarding or inhibiting a release or movement of electrons from the working electrode and into the electrolyte in response to a received sensed indicia of an increased temperature of the controllable cell.

19. A method comprising:
   sensing indicia of an increased temperature of a controllable cell;
   receiving the indicia of the increased temperature of the controllable cell; and
   biasing a gating electrode of the controllable cell in response to the indicia, the controllable cell configured to output electric power and including a working electrode configured to transfer electrons to or from an electrolyte of the controllable cell, and the gating electrode spaced-apart from the working electrode and configured if biased relative to the working electrode to modify an electric charge, field, or potential in the space between the electrolyte and the working electrode.

20. A method comprising:

sensing indicia of a change in current draw or a voltage across output terminal electrodes of a controllable cell;

receiving the indicia indicative of the current draw or the voltage drop across the output terminal electrodes of the controllable cell; and biasing a gating electrode of the controllable cell in response to the indicia, the controllable cell configured to output electric power and including a working electrode configured to transfer electrons to or from an electrolyte of the controllable cell, and the gating electrode spaced-apart from the working electrode and configured if biased relative to the working electrode to modify an electric charge, field, or potential in the space between the electrolyte and the working electrode.

* * * * *